US012647430B2

(12) United States Patent
King et al.

(10) Patent No.: US 12,647,430 B2
(45) Date of Patent: Jun. 2, 2026

(54) DISRUPTION OF RETROSPECTIVE DECRYPTION OPERATIONS

(71) Applicant: Bank of America Corporation, Charlotte, NC (US)

(72) Inventors: Adam Kristian King, Fort Mill, SC (US); James Siekman, Charlotte, NC (US); Sanjay Lohar, Charlotte, NC (US); Matthew Bryant, Mount Holly, NC (US); Catherine Cunningham, Charlotte, NC (US); Takiyah Watford, Fort Mill, SC (US); Elizabeth Swanzy-Parker, Charlotte, NC (US); Peter Nein, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 49 days.

(21) Appl. No.: 18/817,049

(22) Filed: Aug. 27, 2024

(65) Prior Publication Data

US 2026/0067290 A1    Mar. 5, 2026

(51) Int. Cl.
H04L 9/40          (2022.01)

(52) U.S. Cl.
CPC ................................. H04L 63/1408 (2013.01)

(58) Field of Classification Search
CPC ............. H04L 63/1416; H04L 63/1491; H04L 63/1433
See application file for complete search history.

(56) References Cited

U.S. PATENT DOCUMENTS

| | | | |
|---|---|---|---|
| 11,755,733 B1 * | 9/2023 | Armangau ............ | G06F 21/561 726/23 |
| 2021/0073407 A1 * | 3/2021 | Yu ........................... | H04L 9/088 |
| 2023/0061162 A1 * | 3/2023 | Goska .................. | G05B 13/027 |
| 2025/0330493 A1 * | 10/2025 | Mittelman Elberg ...................... | H04L 63/1491 |

* cited by examiner

*Primary Examiner* — Olugbenga O Idowu

(74) *Attorney, Agent, or Firm* — Weiss & Arons LLP

(57) ABSTRACT

Systems, methods, and apparatus are provided for disruption of retrospective decryption operations. A home server may receive an encrypted communication from a data packet and execute a predetermined response. Absence of the predetermined response may initiate a protocol that dynamically mutates the size and processing requirements for the data packet. A monitoring network associated with the home server may receive power and network usage data from network nodes deployed at a plurality of geographic locations. The monitoring network may detect shifts in power and network usage that exceed a predetermined threshold and match the shifts to the processing requirements of the mutated data packet. The monitoring network may activate automated responses including generating a geographic beacon, transmitting an alert, blocking network access to the beacon location, and/or blocking access to the home server.

20 Claims, 4 Drawing Sheets

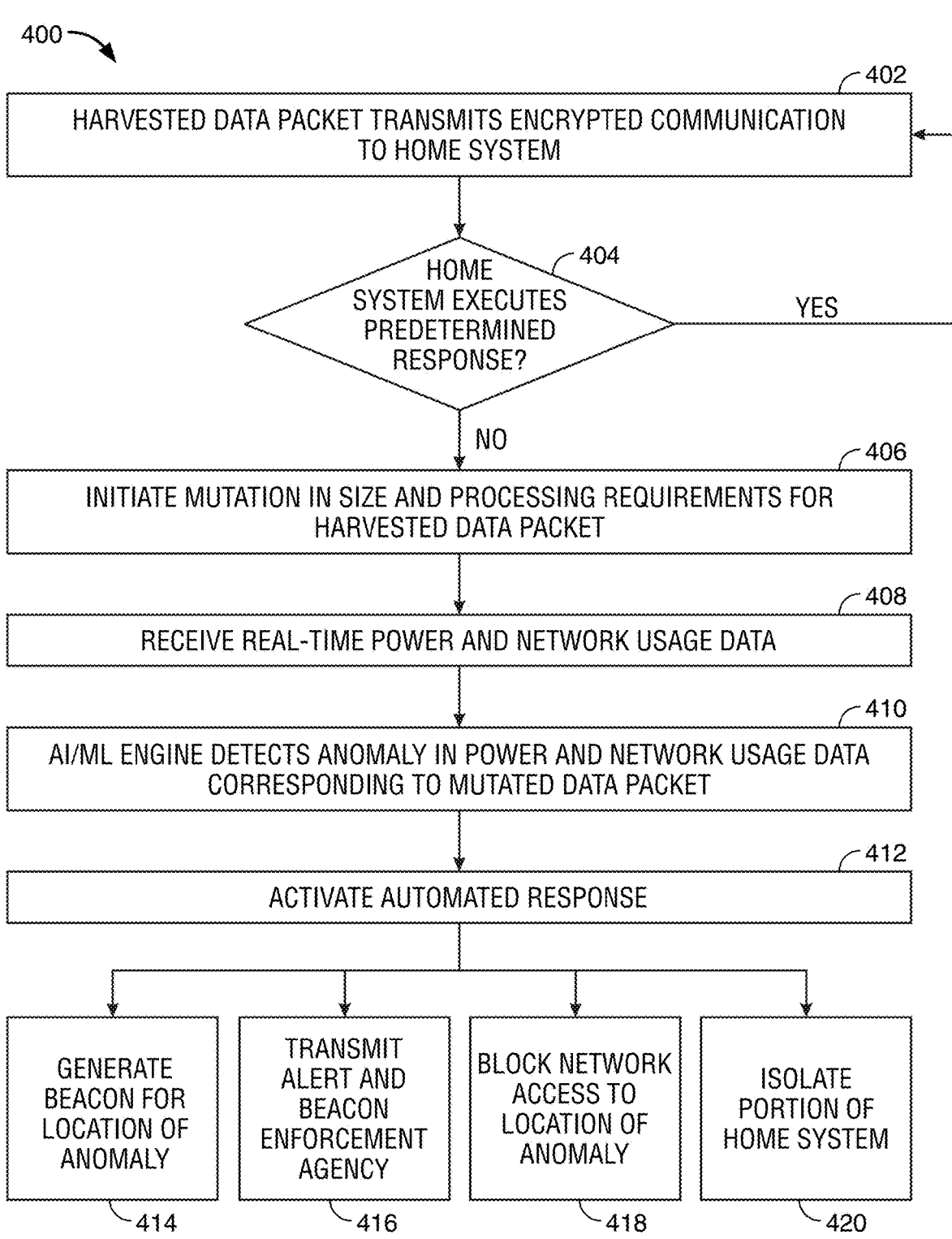

400

402
HARVESTED DATA PACKET TRANSMITS ENCRYPTED COMMUNICATION
TO HOME SYSTEM

404
HOME SYSTEM EXECUTES PREDETERMINED RESPONSE?

YES

NO

406
INITIATE MUTATION IN SIZE AND PROCESSING REQUIREMENTS FOR
HARVESTED DATA PACKET

408
RECEIVE REAL-TIME POWER AND NETWORK USAGE DATA

410
AI/ML ENGINE DETECTS ANOMALY IN POWER AND NETWORK USAGE DATA
CORRESPONDING TO MUTATED DATA PACKET

412
ACTIVATE AUTOMATED RESPONSE

GENERATE
BEACON FOR
LOCATION OF
ANOMALY
414

TRANSMIT
ALERT AND
BEACON
ENFORCEMENT
AGENCY
416

BLOCK NETWORK
ACCESS TO
LOCATION OF
ANOMALY
418

ISOLATE
PORTION OF
HOME SYSTEM
420

FIG. 4

DISRUPTION OF RETROSPECTIVE DECRYPTION OPERATIONS

FIELD OF TECHNOLOGY

Aspects of the disclosure relate to detection and remediation of a data breach.

BACKGROUND OF THE DISCLOSURE

Encryption methods based on the latest technological improvements are typically sufficient to protect data from bad actors.

One challenge to such encryption is the risk that bad actors may attack and harvest data, then wait for advances in computing power and decryption techniques that would enable them to decrypt the data in the future. The harvested data may be stored in server farms, sometimes for periods of years, while decryption technology evolves and improves.

It would be desirable to embed and selectively activate protections within the harvested data to disrupt illicit operations at these server farms and prevent bad actors from decrypting and using the data in the future.

SUMMARY OF THE DISCLOSURE

Systems, methods, and apparatus are provided for disruption of retrospective decryption operations.

A home server may be an origin point for a data packet. The home server may receive an encrypted communication from the data packet and execute a predetermined response. The data packet may transmit the encrypted communication on a periodic schedule.

Absence of the predetermined response at the data packet may initiate a protocol that dynamically mutates a size and processing requirement for the data packet, rendering it detectable to a monitoring network.

A monitoring network associated with the home server may receive power and network usage data from one or more network nodes. The nodes may be deployed at a plurality of geographic locations.

The monitoring network may detect a shift in power usage. The shift in power usage may exceed a predetermined threshold. The monitoring network may detect a shift in network usage. The shift in network usage may exceed a predetermined threshold.

The monitoring network may match the shift to the size and processing requirement of the mutated data packet. The monitoring network may activate an automated response.

The automated response may include generating a beacon for a location associated with the shift in power usage. The automated response may include transmitting an alert including the beacon. The automated response may include blocking network access to the location. The automated response may include blocking access to at least a portion of the home server.

In some embodiments, the home server may validate the encrypted communication from the data packet against predefined criteria comprising a cryptographic signature and an access permission.

In some embodiments, the monitoring network may interface with a remote server associated with an energy provider to detect a shift in power usage. The monitoring network may interface with a network telemetry system to detect a shift in network usage.

In some embodiments, the monitoring network may include one or more artificial intelligence/machine learning (AI/ML) algorithms. The AI/ML algorithms may output a baseline range of power and network usage based on training data. The AI/ML algorithms may detect a shift from the baseline range of power and network usage in real time.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 4 shows an illustrative process flow in accordance with principles of the disclosure.

DETAILED DESCRIPTION

Figure 1:
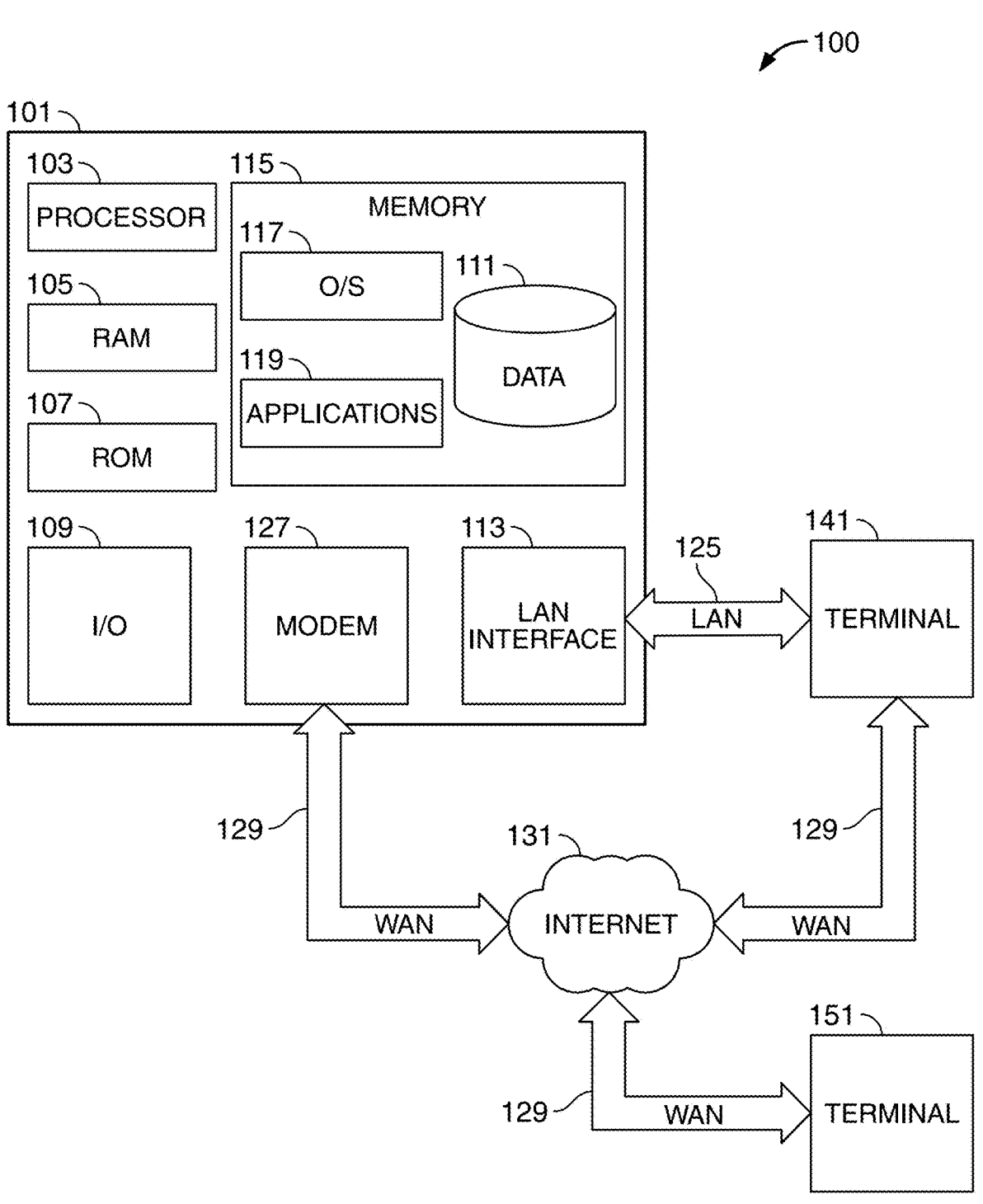
FIG. 1 shows illustrative apparatus in accordance with principles of the disclosure.

Systems, methods, and apparatus are provided for disruption of retrospective decryption operations.

A robust encryption protocol using advanced current methods may be sufficient to protect data from decryption by bad actors. However, the data is still subject to the risk of misappropriation by bad actors who may harvest and hold the data while decryption technology evolves.

It would be desirable to embed protections in the data itself that may be activated to track harvested data. It would be desirable to embed protections in the data that will disrupt operations at a server farm storing the harvested data. It would be desirable to leverage unique features of the data to locate the harvested data and activate embedded protections.

The harvested data may include an encrypted data packet. The data packet may include embedded protection protocols. These protocols may enable the packet to detect that it is located at a host system outside an authorized environment.

In some embodiments, the data packet may use periodic check-ins to determine that it is outside an authorized environment. A check-in may provide a real-time validation of data integrity and authentication status.

The check-in may include communication with a home system. The home system may be an authorized environment. The home system may be the origin point for the data. The data packet may communicate with the home system through secure channels. The communication may include a packet internet or inter-network groper (PING) to a home network internet protocol (IP) address, or any other suitable form of communication.

The embedded protocols may initiate a check-in at predetermined intervals. For example, a check-in may be initiated weekly or monthly. The length of the interval may be based on the sensitivity of the data. For example, in the case of highly sensitive data, check-ins may be initiated hourly. In some embodiments, the embedded protocols may include transmission of substantially continuous check-in signals to the home system. In some embodiments, the embedded protocols may initiate a check-in at random intervals. The schedule for the check-ins may be varied by a home system administrator, by an AI/ML algorithm, or by any suitable party or mechanism.

The home system may validate the data packet against predefined criteria. The criteria may include a cryptographic signature. The criteria may include access permissions. If the validation is successful, the home system may execute a predetermined response. If the validation fails, the data packet may be determined to be outside its authorized environment.

In some embodiments, the data packet may use proximity detection to determine that it is outside an authorized environment. In some embodiments, the data packet may initiate proximity detection in response to a failed check-in or a predetermined number of failed check-ins.

The encrypted data packet may include embedded proximity detection protocols. Proximity detection may include detection of other system components associated with the host environment. The protocols may use artificial intelligence/machine learning (AI/ML) algorithms and behavioral analysis to analyze network traffic, system logs, and/or user activity to map the host system.

The protocols may compare a proximity detection result to past results for proximity detection in the home system. Based on a comparison to past results, the data packet may be determined to be outside its authorized environment.

The data packet may initiate proximity detection protocols at predetermined intervals or at random intervals. The schedule for the proximity detection protocols may be based on the sensitivity of the data. The schedule for the proximity detection protocols may be varied by a home system administrator, by an AI/ML algorithm, or by any suitable party or mechanism.

A determination that the data packet is outside its authorized environment may activate protections embedded in the data packet.

One form of embedded protection may include algorithms that digitally degrade the harvested data. The embedded protection may include a digital apoptosis algorithm. Apoptosis is biological process for controlled, programmed, cell death. The apoptosis algorithm may operate at a granular level within the data packet code and may apply cryptographic techniques to systematically modify the data.

The apoptosis algorithm may alter the structure and content of the harvested data. In some embodiments, the alterations may be irreversible. In some embodiments, the modified data may be reconstructed by an authorized party.

The apoptosis algorithm may operate over a predetermined length of time. The apoptosis algorithm may operate gradually, at an incremental rate. The apoptosis algorithm may operate in a series of phases. For example, the algorithm may modify the data over the course of a week, a month, a year, or any suitable period. The length of time may be calibrated to prevent detection by the host systems storing the harvested data. In some embodiments, the apoptosis algorithm may be applied in conjunction with proximity detection protocols that map the host system. The length of time may be varied based on specific system components detected in the host environment.

In some embodiments, embedded protocols may activate the apoptosis algorithm after a predetermined waiting period. During the waiting period, the protocols may access network traffic and gather information about operations at the host system. The determination of whether to immediately activate the apoptosis algorithm or activate the algorithm following a waiting period may depend on the sensitivity level of the data. The waiting period and/or the correlation to different sensitivity levels may be varied by a network administrator, by an AI/ML algorithm, or by any suitable party or mechanism.

Another form of embedded protection may include a self-destruct mechanism. The self-destruct mechanism may be based on proximity detection.

As set forth above, the encrypted data packet may include proximity detection protocols. Proximity detection may include detection of other system components associated with the host environment. The protocols may use AI/ML algorithms and behavioral analysis to analyze network traffic, system logs, and user activity to map the host system. Embedded protocols may initiate a self-destruct mechanism that affects both the harvested data and the mapped host system.

The self-destruct mechanism may operate on the code within software applications, scripts, and/or data repositories. The self-destruct mechanism may initiate a rapid and irreversible process that systematically destroys compromised data. The process may include wiping storage devices, deleting files, and scrambling data structures to render them unusable.

The self-destruct mechanism may operate on hardware associated with the host system. The protocols may include manipulating electromagnetic current in network devices to overheat, overload, or otherwise damage system devices.

In contrast to the apoptosis algorithm, which may be designed to operate undetected, the self-destruct mechanism may have effects that are difficult to conceal. The self-destruct mechanism may operate within a predetermined time frame to irreversibly damage the harvested data and/or the host system. The predetermined time frame may be calibrated to inflict damage faster than the host system can respond.

Another form of embedded protection may include transmitting an alert. The alert may be initiated in response to a failed validation, a proximity determination that determines the data packet is outside the outside the home system, or any other suitable event.

Embedded protocols may generate an alert message. The alert message may include a timestamp, a type of breach, a list of affected data packets, a list of affected areas in the home system, and/or any other suitable information.

In some embodiments, the embedded protocols may signal the location of the harvesting operation. The protocols may generate a location beacon. The beacon may include GPS coordinates, IP addresses, or any suitable data associated with the host system.

The alert message and/or the location beacon may be transmitted through a secure channel. The alert may be transmitted to the home system. The alert may be transmitted to an enforcement agency. The alert may be transmitted to a network administrator associated with the host system and/or the home system. The alert may trigger an automated response by the home system. For example, the alert may trigger a data lockdown or access restriction at the home system.

Another form of embedded protection may include protocols that render the harvested data detectable by outside systems. The data may be decoy data that has no purpose other than to render itself trackable upon harvesting. The data may be a honeypot trap that lures a bad actor with apparent vulnerability. For example, the honeypot data may be targeted because it includes apparent high return targets or because it is deliberately stored with incomplete security.

The embedded protocols may cause the data packet to dynamically increase in size and complexity each time the data packet is transferred. The embedded protocols may cause the data packet to increase in size and complexity each time the data packet is accessed. For example, the embedded protocols may activate bloatware or may initiate processing steps that require significant resource consumption.

In some embodiments, the embedded protocols in the honeypot file may be initiated only in response to a determination that the data is outside an authorized environment. The determination may be based on a check-in or on proximity detection, as described above. However, the honeypot file may contain only decoy data. As such, it would have no legitimate use within the home system and the embedded protocols may initiate bloatware and other file changes at every instance of access or transfer without risk of impacting processing at the home system.

The increase in size and complexity of the data packet may generate detectable processing anomalies. For example, the processing may cause spikes in energy consumption, affect network traffic, and increase latency. These anomalies may indicate data harvesting operations.

The legitimate owners of the data or any other suitable party may operate a monitoring network designed to detect the anomalies. The monitoring network may be associated with the home system. The monitoring network may continuously or discretely monitor network activity and resource utilization.

The monitoring network may include nodes deployed across strategic locations to create comprehensive coverage of global networks. The nodes may continuously collect and analyze energy and network usage data to enable real time detection of anomalies. The monitoring network may interface with outside systems such as energy provider systems, network telemetry operations, and law enforcement systems.

The monitoring network may use one or more AI/ML algorithms to detect and analyze spikes in energy consumption, network activity, and latency that are associated with the honeypot data. The algorithms may analyze historical data and real-time network activity to identify deviations from normal usage patterns. In some embodiments, the honeypot data may be associated with a specific usage pattern that may function as a fingerprint to identify the data packet.

In some embodiments, data harvesting operations may be detectable to a monitoring network without involvement of a honeypot file. Large scale data harvesting operations may cause anomalies in power usage, network activity, network latency and/or any suitable factors associated with a server farm location. An AI/ML engine may determine that these anomalies are associated with data harvesting operations.

Based on detection of an anomaly, the network may identify and disrupt activities at the location of the harvested data. Multiple automated responses may be initiated from a central control point at the monitoring network. The network may signal the data packet to initiate proximity detection, self-destruct operations, or an apoptosis algorithm, as described above.

The monitoring network may generate a beacon associated with the location of the harvested data. The network may transmit the beacon information to a law enforcement agency. The beacon may provide real-time location information for the data harvesting operation to security personnel.

The monitoring network may block access to the location of the harvested data. The monitoring network may lock down access to the home system.

Based on detection of the anomalies, the network may initiate automated response mechanisms at the home system. These mechanisms may include isolating affected servers and alerting security at the home system. The automated response mechanisms may include initiating proximity detection within the home system.

Proximity detection at the home system may include detection and identification of system components affected by the data harvesting. The protocols may use AI/ML algorithms and behavioral analysis to analyze network traffic, system logs, and user activity to determine the extent of the compromise. The protocol may calculate the proximity of each implicated system component to the initial breach point.

Proximity detection at the home system may trigger self-destruct protocols. A self-destruct algorithm may be embedded at the code level within software applications, scripts, and/or data repositories. The self-destruct algorithm may initiate a rapid and irreversible process that systematically destroys compromised data. The process may include wiping storage devices, deleting files, and scrambling data structures to render them unusable.

In some embodiments, self-destruct protocols at the home system may be triggered immediately in response to a determination that data harvesting has occurred. The protocols may include emergency shut-down procedures that isolate affected systems from the other parts of the network and alert security services. The protocols may operate without manual intervention.

One or more non-transitory computer-readable media storing computer-executable instructions are provided. When executed by a processor on a computer system, the instructions may perform a method for detecting an unauthorized transfer of a data packet from a home server. The home server may be an origin point for the data packet.

The method may include receiving a communication from the data packet at the home server. The data packet may execute the encrypted communication on a predetermined periodic schedule.

The method may include executing a predetermined response. Absence of the predetermined response may initiate a protocol that dynamically mutates the size and processing requirements for the data packet.

The method may include receiving power and network usage data from one or more network nodes at a monitoring network associated with the home server. The nodes may be deployed at a plurality of geographic locations.

The method may include detecting a shift in power usage. The shift may exceed a predetermined threshold. The method may include detecting a shift in network usage. The shift may exceed a predetermined threshold. The method may include matching the shift to the size and processing requirements for the mutated data packet.

The method may include activating an automated response at the home server. The response may involve generating a beacon for a location associated with the shift in power usage. The response may involve transmitting an alert including the beacon. The response may involve blocking network access to the location. The response may involve blocking access to at least a portion of the home server.

The method may include interfacing with a remote server associated with an energy provider to detect the shift in power usage. The method may include interfacing with a network telemetry system to detect the shift in network usage.

The method may include validating the encrypted communication from the data packet against predefined criteria. The criteria may include a cryptographic signature and an access permission.

The method may include using one or more AI/ML algorithms, generating a baseline range of power and network usage based on training data. The method may include using the AI/ML algorithms to detect a shift from the baseline range of power and network usage in real time.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
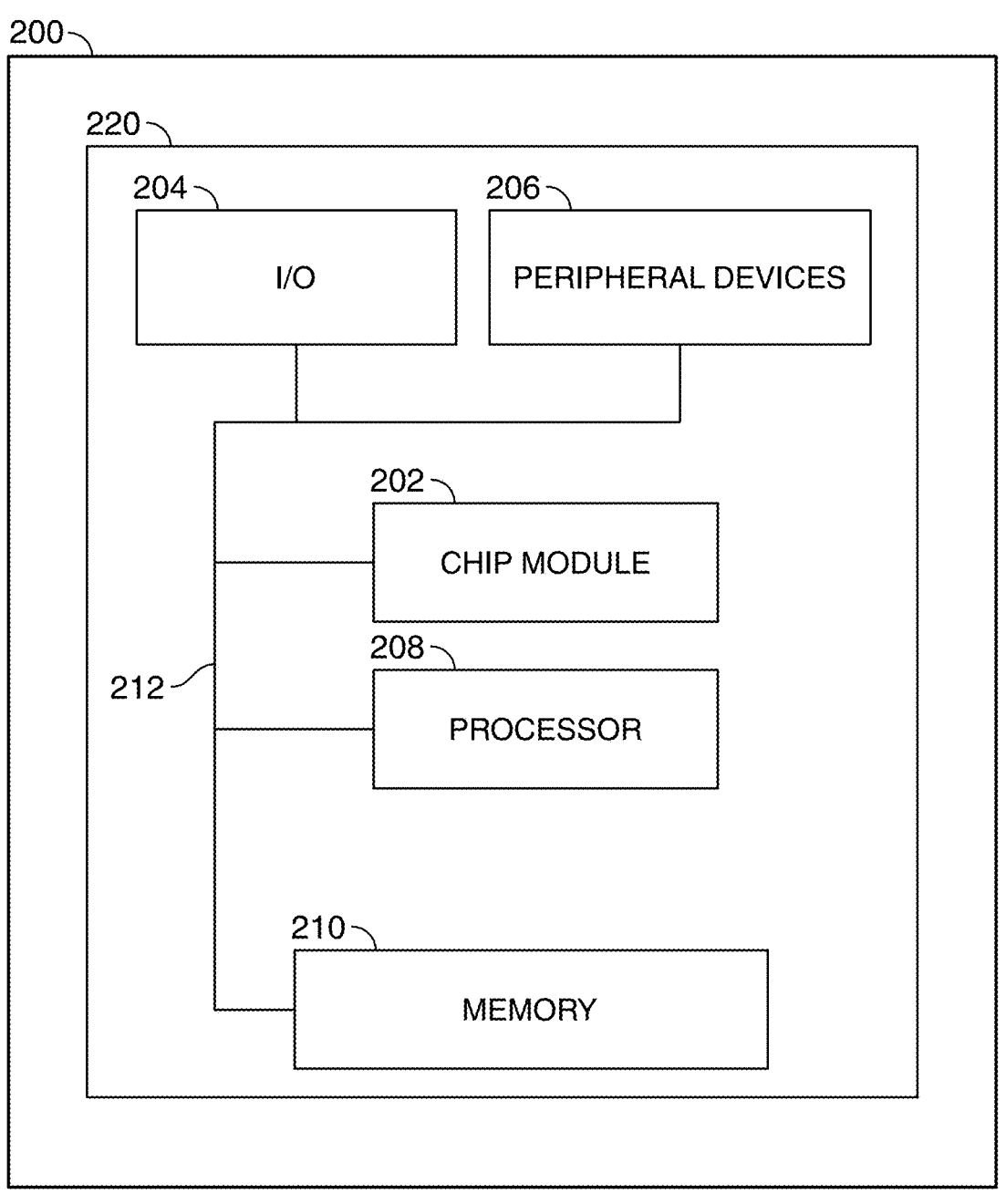
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
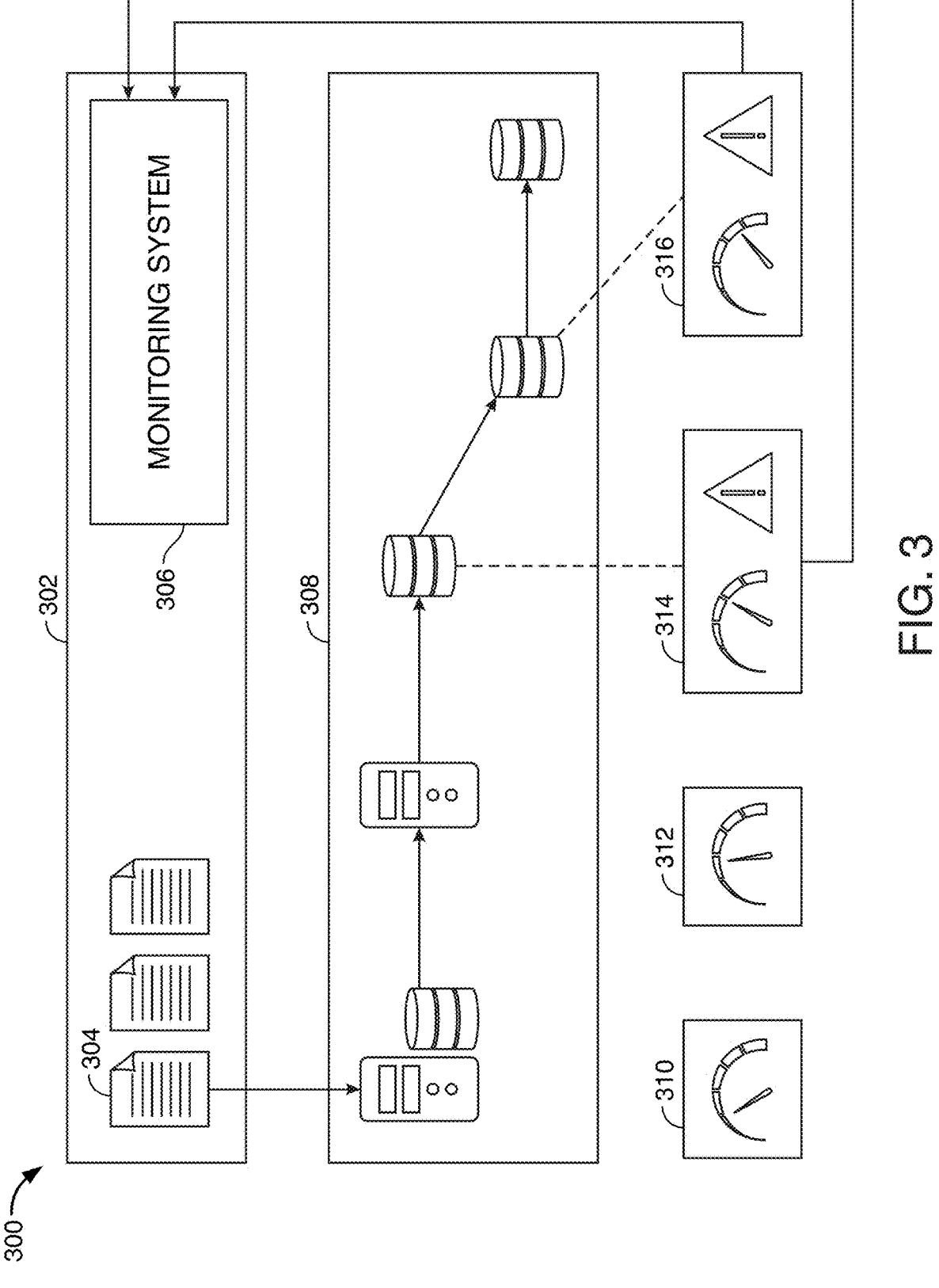
FIG. 3 shows an illustrative process flow in accordance with principles of the disclosure.

FIG. 3 shows illustrative process flow 300 for disrupting retrospective decryption operations. Home system 302 may include data file 304 and monitoring system 306.

Host system 308 may include servers and databases for illicit data harvesting operations and long-term storage of the harvested data for retrospective decryption. Host system 308 may be a server farm.

Data file 304 may include embedded protection protocols. Embedded protocols may initiate a mutation that renders processing of the data file detectable to outside systems. The mutation may increase the size of the file. The mutation may increase the complexity of the file. The mutation may initiate operations that increase the processing time required for the file.

Data file 304 may be a honeypot data file with no purpose other than to lure bad actors. Because data file 304 has no purpose within the home system, it may include protections that are activated at any instance of transfer or access without impacting home system operations.

Host system 308 may include multiple instances when data file 304 is transferred to different parts of the system. Data file 304 may mutate at each instance.

Processing of mutated data file 304 may cause detectable spikes in power usage, network activity, and/or network latency. Globally distributed nodes 310-316 may monitor networks for such spikes. In some embodiments, nodes 310-316 may be in communication with other monitoring systems such as systems associated with energy providers. Following a series of sequential mutations, nodes 314 and 316 may detect high usage levels associated with host system 308.

Monitoring system 306 may be in communication with nodes 310-316. In some embodiments, all usage data may be reported to monitoring system 306. In some embodiments, only usage data above a predetermined threshold may be reported to monitoring network 306.

Monitoring system 306 may include one or more AI/ML algorithms. The AI/ML algorithms may use historical data to determine a baseline range for power usage, network activity, network latency, and any other suitable factors. Based on usage data received from nodes 310-316, the AI/ML algorithms may detect an anomaly in usage in real-time. In some embodiments, the AI/ML algorithm may identify and detect a specific usage pattern that corresponds to mutated data file 304. In response to detection of a usage anomaly, the AI/ML algorithms may initiate automated response protocols.

FIG. 4 shows illustrative process flow 400 for disrupting retrospective decryption operations. At 402, a harvested data packet may transmit an encrypted communication to its home system.

At 404 the home system may execute a predetermined response. If the harvested data packet receives the predetermined response, it may continue to transmit check-in communications at predetermined intervals.

At 406, if the harvested data packet does not receive the predetermined response, embedded protection protocols may mutate the data packet to increase its size and processing requirements. At 408, a monitoring network associated with the home system may receive real-time power and network usage data from a global network of nodes. At 410, an AI/ML engine may detect an anomaly in power and network use that corresponds to processing the mutated data packet.

At 412, the monitoring network may activate an automated response. At 414, the automated response may include generating a beacon for the location of the anomaly. At 416, the automated may include transmitting an alert along with the beacon to an enforcement agency. At 418, the automated response may include blocking network access to the location of the anomaly. At 420, the automated response may include isolating a portion of the home system.

Thus, methods and apparatus for DISRUPTION OF RETROSPECTIVE DECRYPTION OPERATIONS are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for detecting an unauthorized transfer of a data packet from a home server, the home server comprising an origin point for the data packet, the method comprising:

at the home server:

receiving an encrypted communication executed by the data packet; and executing a predetermined response, wherein absence of the predetermined response initiates a protocol, the protocol dynamically mutating a size and processing requirement for the data packet; and at a monitoring network associated with the home sever:

receiving power and network usage data from one or more network nodes, the nodes deployed at a plurality of geographic locations;

detecting a shift in power usage, the shift exceeding a predetermined threshold;

detecting a shift in network usage, the shift exceeding a predetermined threshold;

matching the shift in power usage and the shift in network usage to the size and processing requirement of the mutated data packet; and activating an automated response comprising:

generating a beacon for a location associated with the shift in power usage;

transmitting an alert comprising the beacon;

blocking network access to the location; and blocking access to at least a portion of the home server.

2. The method of claim 1, wherein detecting a shift in power usage comprises interfacing with a remote server associated with an energy provider.

3. The method of claim 1, wherein detecting a change in network usage comprises interfacing with a network telemetry system.

4. The method of claim 1, the data packet configured to execute the encrypted communication on a predetermined periodic schedule.

5. The method of claim 1, further comprising, at the home server, validating the encrypted communication from the data packet against predefined criteria comprising a cryptographic signature and an access permission.

6. The method of claim 1, the monitoring network comprising one or more artificial intelligence/machine learning (AI/ML) algorithms configured to output a baseline range of power and network usage based on training data.

7. The method of claim 6, the AI/ML algorithms configured to detect a shift from the baseline range of power and network usage in real time.

8. One or more non-transitory computer-readable media storing computer-executable instructions which, when executed by a processor on a computer system, perform a method for detecting an unauthorized transfer of a data packet from a home server, the home server comprising an origin point for the data packet, the method comprising:

receiving an encrypted communication executed by the data packet;

executing a predetermined response, wherein absence of the predetermined response initiates a protocol, the protocol dynamically mutating a size and processing requirement;

receiving power and network usage data from one or more network nodes, the nodes deployed at a plurality of geographic locations;

detecting a shift in power usage, the shift exceeding a predetermined threshold;

detecting a shift in network usage, the shift exceeding a predetermined threshold;

matching the shift in power usage and the shift in network usage to the packet size and processing requirement of the mutated data packet; and activating an automated response comprising:

generating a beacon for a location associated with the shift in power usage;

transmitting an alert comprising the beacon;

blocking network access to the location; and blocking access to at least a portion of the home server.

9. The media of claim 8, wherein detecting a shift in power usage comprises interfacing with a remote server associated with an energy provider.

10. The media of claim 8, wherein detecting a change in network usage comprises interfacing with a network telemetry system.

11. The media of claim 8, the data packet configured to execute the encrypted communication on a predetermined periodic schedule.

12. The media of claim 8, the method further comprising validating the encrypted communication from the data packet against predefined criteria comprising a cryptographic signature and an access permission.

13. The media of claim 8, the method further comprising, using one or more artificial intelligence/machine learning (AI/ML) algorithms, generating a baseline range of power and network usage based on training data.

14. The media of claim 13, the AI/ML algorithms configured to detect a shift from the baseline range of power and network usage in real time.

15. A system for detecting an unauthorized transfer of a data packet from a home server, the home server comprising an origin point for the data packet, the system comprising:

a home server configured to:

receive an encrypted communication executed by the data packet; and execute a predetermined response to the encrypted communication, wherein absence of the predetermined response initiates a protocol, the protocol dynamically mutating a packet size and processing requirement; and a monitoring network associated with the home sever configured to:

receive power and network usage data from one or more network nodes, the nodes deployed at a plurality of geographic locations;

detect a shift in power usage, the shift exceeding a predetermined threshold;

detect a shift in network usage, the shift exceeding a predetermined threshold;

match the shift in power usage and the shift in network usage to the packet size and processing requirement of the mutated data packet; and activate an automated response comprising:

generating a beacon for a location associated with the shift in power usage;

transmitting an alert comprising the beacon;

blocking network access to the location; and blocking access to at least a portion of the home server.

16. The system of claim 15, wherein detecting a shift in power usage comprises interfacing with a remote server associated with an energy provider.

17. The system of claim 15, wherein detecting a change in network usage comprises interfacing with a network telemetry system.

18. The system of claim 15, the data packet configured to execute the encrypted communication on a predetermined periodic schedule.

19. The system of claim 15, the home server further configured to validate the encrypted communication from the data packet against predefined criteria comprising a cryptographic signature and an access permission.

20. The system of claim 15, the monitoring network comprising one or more artificial intelligence/machine learning algorithms configured to:

output a baseline range of power and network usage based on training data; and detect a shift from the baseline range of power and network usage in real time.

\* \* \* \* \*